United States Patent
Ahn et al.

(10) Patent No.: US 10,055,633 B2
(45) Date of Patent: Aug. 21, 2018

(54) MOBILE TERMINAL AND METHOD FOR CONTROLLING THE SAME

(71) Applicant: LG ELECTRONICS INC., Seoul (KR)

(72) Inventors: Yehan Ahn, Seoul (KR); Cheegoog Kim, Seoul (KR); Hangshin Cho, Seoul (KR); Mansoo Sin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/706,119

(22) Filed: May 7, 2015

(65) Prior Publication Data
US 2015/0363632 A1 Dec. 17, 2015

(30) Foreign Application Priority Data

Jun. 17, 2014 (KR) ........................ 10-2014-0073814

(51) Int. Cl.
| | |
|---|---|
| G06F 3/041 | (2006.01) |
| G06K 9/00 | (2006.01) |
| G06F 3/0488 | (2013.01) |
| G06F 21/32 | (2013.01) |
| G06F 21/60 | (2013.01) |
| H04W 12/06 | (2009.01) |
| H04L 29/06 | (2006.01) |
| H04W 88/02 | (2009.01) |

(52) U.S. Cl.
CPC ....... *G06K 9/00033* (2013.01); *G06F 3/0412* (2013.01); *G06F 3/0488* (2013.01); *G06F 3/04883* (2013.01); *G06F 21/32* (2013.01); *G06F 21/602* (2013.01); *G06K 9/00013* (2013.01); *H04W 12/06* (2013.01); *H04L 63/083* (2013.01); *H04L 63/0861* (2013.01); *H04W 88/02* (2013.01)

(58) Field of Classification Search
CPC .. G06F 3/0412; G06F 3/0488; G06F 3/04883; G06F 21/00; G06F 21/30; G06F 21/31; G06F 21/32; G06K 9/00; G06K 9/00006; G06K 9/00013; G06K 9/00033; G06K 9/00087; G06K 9/00154; G06K 9/00161; G06K 9/00181; G06K 9/00187
USPC ......................... 345/173; 715/700, 863–866
See application file for complete search history.

(56) References Cited

U.S. PATENT DOCUMENTS

| | | | | |
|---|---|---|---|---|
| 6,879,710 B1* | 4/2005 | Hinoue | ............... | G06F 21/32 |
| | | | | 340/5.53 |
| 7,190,348 B2* | 3/2007 | Kennedy | ............... | G06F 3/0488 |
| | | | | 178/18.01 |

(Continued)

OTHER PUBLICATIONS

French Preliminary Search Report dated Aug. 17, 2017 issued in Application No. 1553715.

*Primary Examiner* — Jason Mandeville
(74) *Attorney, Agent, or Firm* — KED & Associates, LLP

(57) ABSTRACT

The present invention relates to a mobile terminal and a method for controlling the same. The present invention determines whether received touch input is touch input by a finger of a user and, when a function executed by the touch input requires authentication, provides a user interface necessary for authentication differently according to whether the touch input is touch input by the user's finger. Accordingly, fingerprint authentication is processed as necessary, thereby improving processor efficiency.

14 Claims, 25 Drawing Sheets

(56) References Cited

U.S. PATENT DOCUMENTS

| | | | | |
|---|---|---|---|---|
| 7,359,534 B2* | 4/2008 | Semba | ............... | G06K 9/00006 |
| | | | | 382/124 |
| 8,443,199 B2* | 5/2013 | Kim | ................... | G06F 3/03547 |
| | | | | 345/173 |
| 8,564,314 B2* | 10/2013 | Shaikh | ................ | G06K 9/0002 |
| | | | | 324/658 |
| 9,076,008 B1* | 7/2015 | Moy | ....................... | G06F 21/60 |
| 9,244,545 B2* | 1/2016 | Hinckley | ................ | G06F 3/038 |
| 2002/0080123 A1* | 6/2002 | Kennedy | ................ | G06F 3/041 |
| | | | | 345/173 |
| 2004/0155871 A1* | 8/2004 | Perski | ..................... | G06F 3/041 |
| | | | | 345/174 |
| 2005/0063567 A1* | 3/2005 | Saitoh | ................ | G06K 9/00013 |
| | | | | 382/115 |
| 2007/0177777 A1* | 8/2007 | Funahashi | ............... | G06F 21/32 |
| | | | | 382/124 |
| 2008/0001703 A1* | 1/2008 | Goto | ................... | H04M 1/0243 |
| | | | | 340/5.8 |
| 2010/0231356 A1 | 9/2010 | Kim | | |
| 2011/0287741 A1 | 11/2011 | Prabhu | | |
| 2012/0092293 A1* | 4/2012 | Ganapathi | ......... | G02B 26/0833 |
| | | | | 345/174 |
| 2013/0135247 A1* | 5/2013 | Na | .......................... | G06F 21/32 |
| | | | | 345/174 |
| 2013/0201155 A1 | 8/2013 | Wu et al. | | |
| 2013/0287272 A1 | 10/2013 | Lu et al. | | |
| 2013/0287274 A1 | 10/2013 | Shi et al. | | |
| 2014/0270413 A1* | 9/2014 | Slaby | .................... | G06F 3/0488 |
| | | | | 382/124 |
| 2014/0359756 A1* | 12/2014 | Alameh | ................. | G06F 21/32 |
| | | | | 726/19 |
| 2015/0113633 A1* | 4/2015 | Yeom | .................... | H04L 63/083 |
| | | | | 726/18 |

* cited by examiner

MOBILE TERMINAL AND METHOD FOR CONTROLLING THE SAME

CROSS-REFERENCE TO RELATED APPLICATIONS

This application claims priority under 35 U.S.C. § 119 to Korean Patent Application No. 10-2014-0073814 filed on Jun. 17, 2014 in Korea, the entire contents of which are hereby incorporated by reference in their entirety.

BACKGROUND

1. Field

The present invention relates to a mobile terminal capable of processing touch input according to the purpose of touch of a user and a method for controlling the same.

2. Background

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

SUMMARY OF THE DISCLOSURE

An object of the present invention is to provide a mobile terminal capable of processing touch input according to the purpose of touch of a user by accurately processing the touch input and a method for controlling the same.

In addition, another object of the present invention is to provide a mobile terminal capable of efficiently managing resources by obtaining a fingerprint of a user only upon determining that fingerprint authentication is necessary when touch input is received and a method for controlling the same.

Furthermore, another object of the present invention is to provide a mobile terminal capable of improving intuitiveness in use thereof by providing an authentication procedure differently according to touch input means when the authentication procedure is necessary, and a method for controlling the same.

To achieve these objects and other advantages and in accordance with the purpose of the invention, as embodied and broadly described herein, a mobile terminal includes: a touchscreen configured to sense touch input; and a controller configured to determine whether the touch input is touch input by a finger of a user and to provide a user interface necessary for authentication differently according to whether the touch input is touch input by the user's finger when a function executed by the touch input requires authentication.

The mobile terminal may further include a fingerprint sensor integrated with the touchscreen and configured to recognize a fingerprint, wherein the controller may be configured to acquire fingerprint information of the user through the fingerprint sensor when the touch input is touch input by the user's finger and the authentication is necessary and to execute a function intended by the touch input when the acquired fingerprint information corresponds to pre-registered fingerprint information.

The touchscreen may include a plurality of Tx lines, a plurality of Rx lines intersecting the Tx lines and touch sensors respectively formed at intersections of the Tx lines and the Rx lines, wherein a touch IC may be configured to acquire a fingerprint image corresponding to touch sensors touched by the user's finger, from among the touch sensors.

The controller may be configured to recognize coordinates of a touch point corresponding to the touch input and to acquire the fingerprint image through the touch IC when fingerprint authentication is necessary to execute an application corresponding to the recognized coordinates.

The controller may be configured to display a fingerprint input window on the touchscreen and to acquire the fingerprint information of the user through the fingerprint input window.

The controller may be configured to display a window for inputting a predetermined pattern for authentication on the touchscreen when the touch input is not touch input by a finger of the user and the authentication is necessary.

The controller is configured to recognize touch input by a stylus pen.

When the touch input is recognized as touch input by a part of the body of the user other than the finger, the controller may be configured to process only touch input by the finger of the user as normal touch input.

Functions requiring authentication may include at least one of a function of cancelling screen lock, a function of cancelling a locked application and a function of cancelling a lock state of the touchscreen while turning on the touchscreen in an off state.

In another aspect of the present invention, a method for controlling a mobile terminal includes: receiving touch input applied to a touch input; processing the touch input to determine whether the touch input is touch input by a finger of a user; and providing a user interface necessary for authentication differently according to whether the touch input is touch input by the finger of the user when a function executed by the touch input requires authentication.

The method may further include: acquiring fingerprint information of the user through a fingerprint sensor integrated with the touchscreen when the touch input is touch input by the user's finger and authentication is necessary; and executing a function intended by the touch input when the acquired fingerprint information corresponds to pre-registered fingerprint information.

The method may further include displaying a window for inputting a predetermined pattern for authentication on the touchscreen when the touch input is not touch input by the user's finger and authentication is necessary.

The method may further include processing only touch input by the user's finger as normal touch input when the touch input is recognized as touch input by a part of the body of the user other than the finger of the user.

The mobile terminal and the method for controlling the same according to the present invention have the following advantages.

According to at least one embodiment of the present invention, it is possible to process touch input according to purpose of touch of a user by processing the touch input more accurately.

In addition, according to at least one embodiment of the present invention, it is possible to efficiently manage resources of the terminal by obtaining a fingerprint of a user only upon determining that fingerprint authentication is necessary when touch input is received.

Furthermore, according to at least one embodiment of the present invention, intuitiveness in use of the mobile terminal can be improved by providing an authentication procedure differently according to touch input means when the authentication procedure is necessary.

The mobile terminal and the method for controlling the same according to the present invention have the following advantages.

According to at least one of embodiments of the present invention, it is possible to process touch input according to intention of touch of a user by processing the touch input more accurately.

In addition, according to at least one of embodiments of the present invention, resources of the terminal can be efficiently operated by obtaining a fingerprint of a user only upon determining that fingerprint authentication is necessary when touch input is received.

Furthermore, according to at least one of embodiments of the present invention, intuitiveness in use of the mobile terminal can be improved by providing an authentication procedure differently according to touch input means when the authentication procedure is necessary.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The embodiments will be described in detail with reference to the following drawings in which like reference numerals refer to like elements wherein.

DETAILED DESCRIPTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
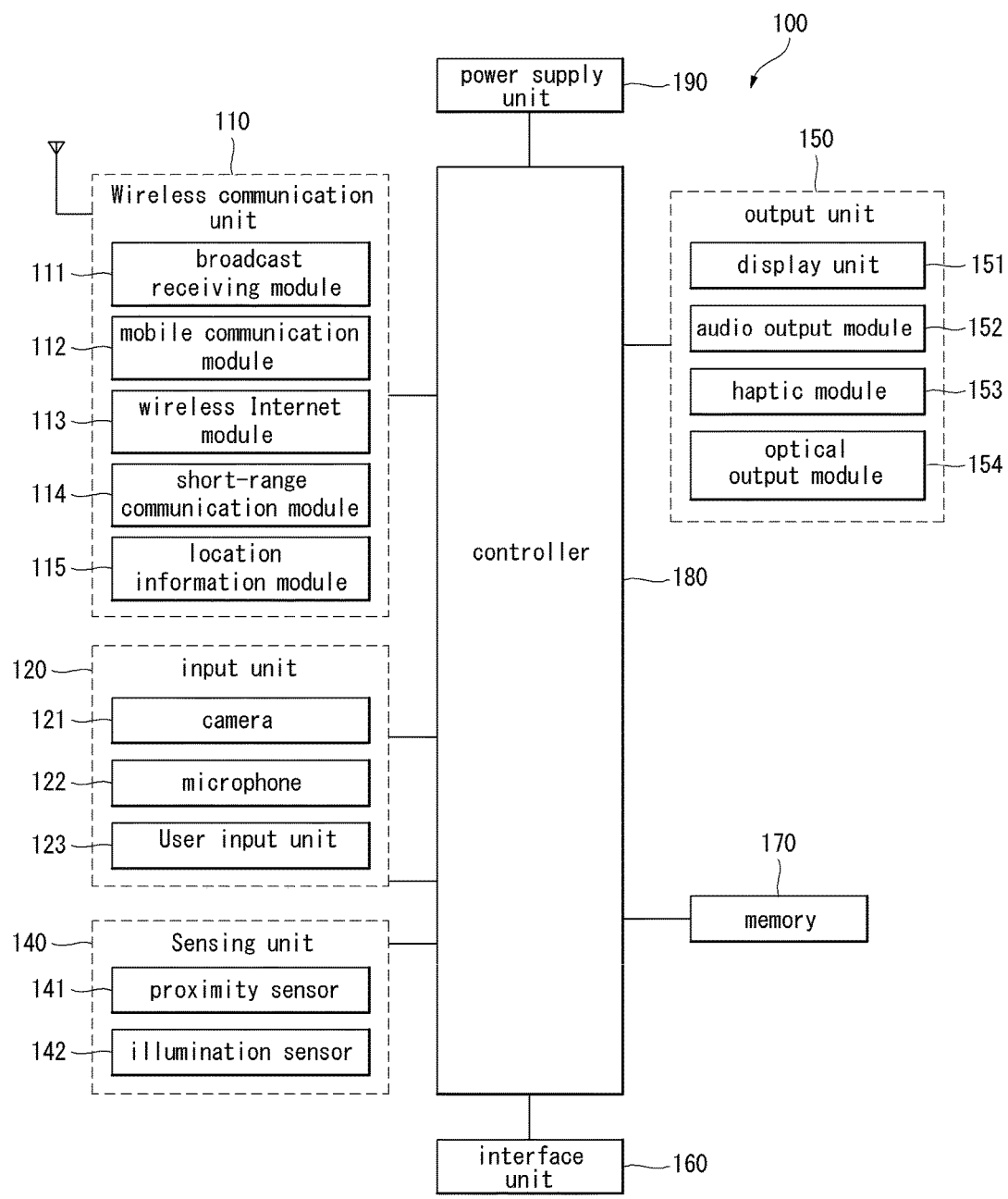
FIG. 1A is a block diagram of a mobile terminal in accordance with the present disclosure.
Figure 1B:
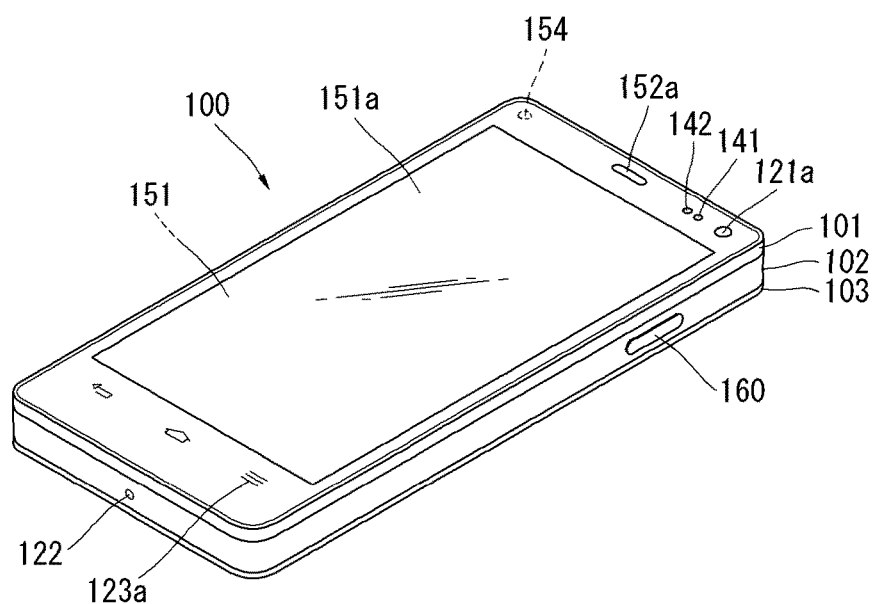
FIGS. 1B and 1C are conceptual views of one example of the mobile terminal, viewed from different directions.
Figure 1C:
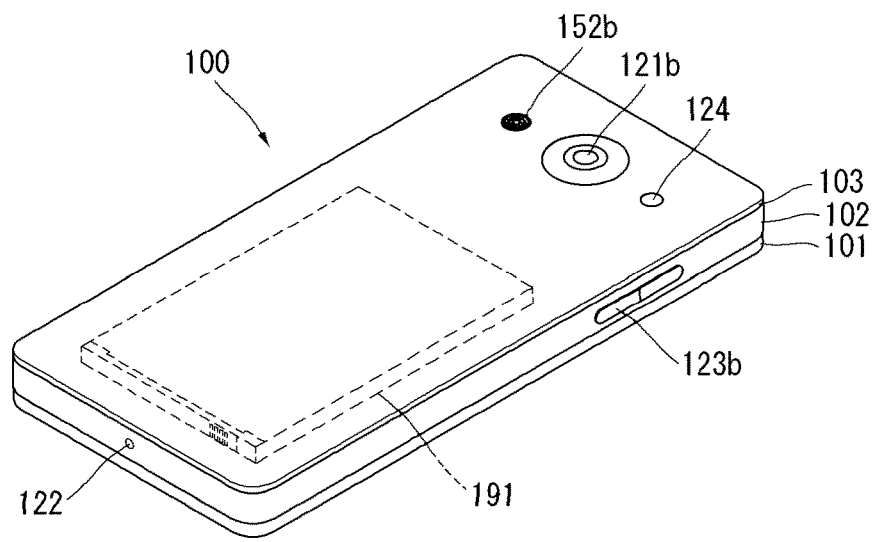

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touchscreen. The touchscreen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touchscreen together with the touch sensor. Here, the touchscreen may serve as the user input unit 123 (see FIG. 1A). Therefore, the touchscreen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touchscreen.

Further preferred embodiments will be described in more detail with reference to additional drawing figures. It is understood by those skilled in the art that the present features can be embodied in several forms without departing from the characteristics thereof.

Figure 2:
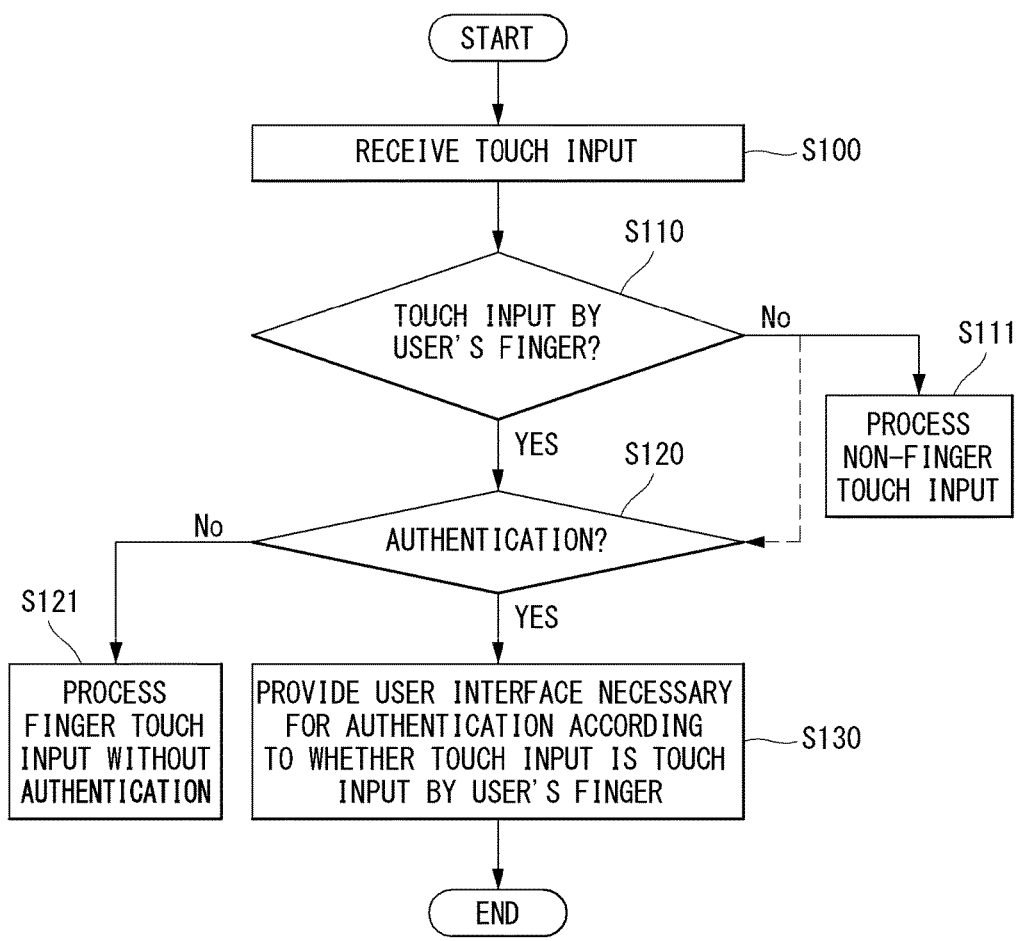
FIG. 2 is a flowchart illustrating a method for controlling a mobile terminal according to an embodiment of the present disclosure.

FIG. 2 is a flowchart illustrating a method for controlling the mobile terminal according to an embodiment of the present invention.

The mobile terminal 100 may sense touch input through the touchscreen 151 (S100).

The touch input may include touch input by a finger of a user, touch input by a touch pen and the like. The touchscreen 151 may recognize contact of part of the body of the user other than a finger of the user as predetermined touch input.

According to an embodiment of the present invention, touch input by a finger of a user can be discriminated from various touch inputs input through the touchscreen 151. It is necessary to ignore unintended touch input and to normally process only intended touch input as touch sensitiveness of the touchscreen 151 increases.

In the meantime, when a fingerprint sensor is integrated with the display unit 151, processing efficiency decreases if all touch sensors uniformly disposed in the touch panel for fingerprint recognition are operated to obtain a fingerprint image.

According to an embodiment of the present invention, it is determined whether touch input applied through the touchscreen 151 is touch input by a human finger and then a fingerprint image is acquired only when a function corresponding to the touch input requires fingerprint authentication.

The controller 180 may determine whether the touch input is touch input by a finger of the user (S110). When the controller 180 determines that the touch input is not an input using a user's finger, the controller 180 may proceed to process the touch input based on the received touch input. For example, when the touch input is made using a stylus pen and authentication is necessary, a window may be displayed to enter a signature, a password, a passcode, or the like. If the touch input does not require authentication, the received touch input may be processed as a normal touch input.

When the touch input is determined to be an input using a user's finger, in step S110, the controller 180 may determine whether authentication of the user is necessary for the received touch input. If authentication is not necessary, the touch input may be processed as a normal input using the user's fingers (S121). Otherwise, if authentication is necessary, a user interface for authenticating the user may be provided (S130). The user interface for authentication when the input is a finger input may be different than an interface displayed for touch inputs using other means, for example, for authenticating using fingerprint authentication rather than a password or other means.

A description will be given of a method for determining whether touch input applied to the touchscreen 151 is touch input by a user's finger according to a predetermined touch algorithm.

Figure 3:
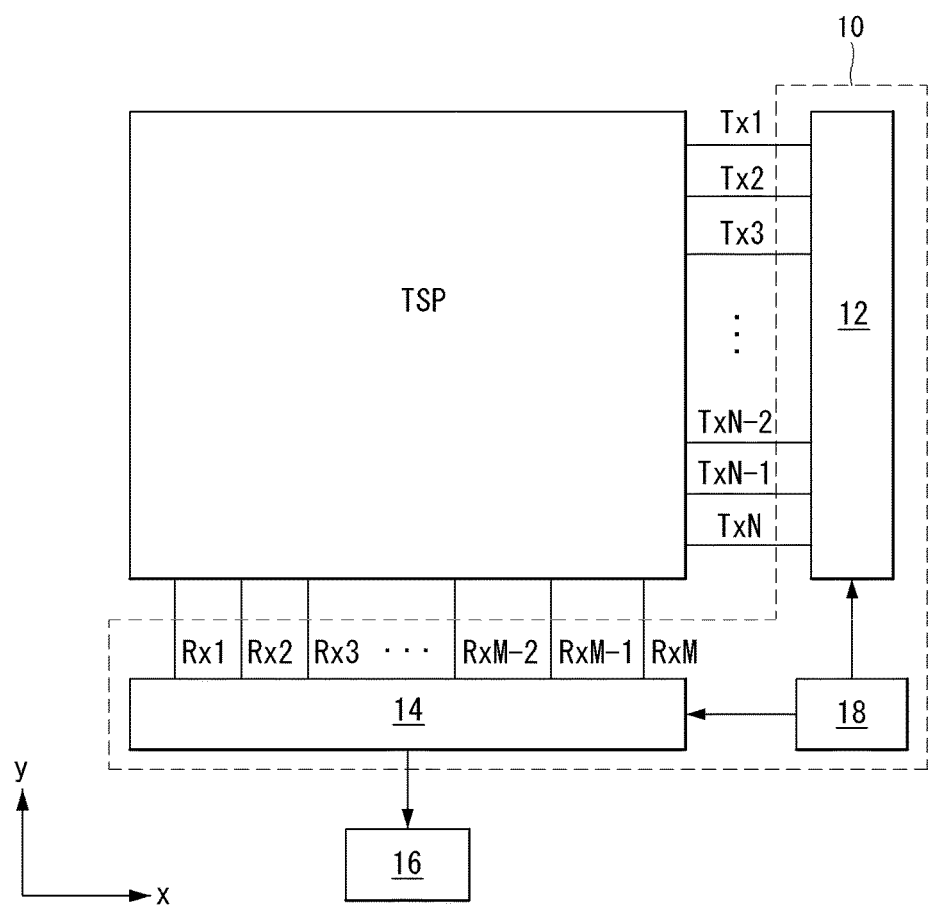
FIG. 3 illustrates a touch sensing system of the mobile terminal according to an embodiment of the present disclosure.
Figure 4:
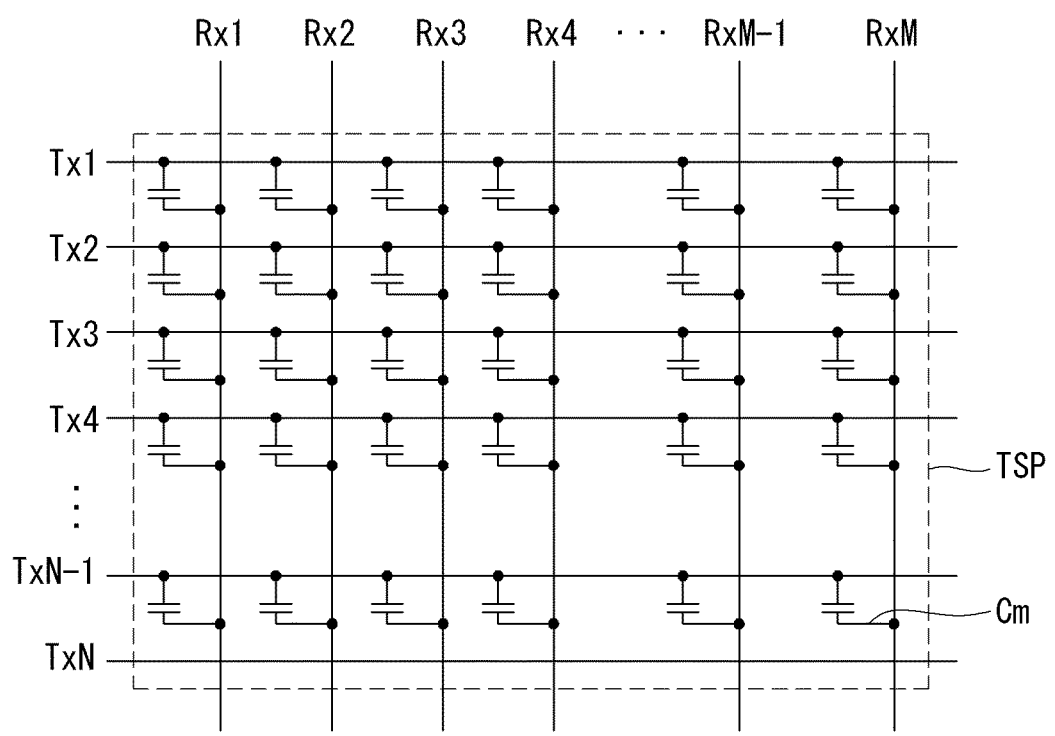
FIG. 4 is an equivalent circuit diagram of a touchscreen shown in FIG. 3.

FIG. 3 illustrates a touch sensing system of the mobile terminal according to an embodiment of the present invention and FIG. 4 is an equivalent circuit diagram of the touchscreen shown in FIG. 3.

Referring to FIGS. 3 and 4, the touch sensing system of the touchscreen 151 may be implemented as a capacitive touch sensing system that senses touch input through a plurality of capacitance sensors. The touch sensing system may include the touchscreen (TSP) 151, a touchscreen drive circuit, etc.

The touchscreen TSP includes Tx channels Tx1 to TxN (N being a positive integer), Rx channels Rx1 to RxM (M being a positive integer) intersecting the Tx channels Tx1 to TxN and M×N touch sensors Cm formed at intersections of the Tx channels Tx1 to TxN and the Rx channels Rx1 to RxM. Each touch sensor Cm has mutual capacitance.

The touchscreen drive circuit may include a touch sensing circuit 10 and a coordinate calculator 16. The touchscreen drive circuit may provide a driving signal to the touchscreen TSP so as to sense voltage variations in the touch sensors and transmit coordinate information on a touch input point to a module that requires the coordinate information.

The touch sensing circuit 10 may include a Tx drive circuit 12, an Rx drive circuit 14 and a Tx/Rx controller 18, etc.

The touch sensing circuit 10 applies a driving signal to the touch sensors through the Tx channels Tx1 to TxN using the Tx drive circuit 12 in a normal operation mode and senses voltages of the touch sensors Cm through the Rx channels Rx1 to RxM and the Rx drive circuit 14 in synchronization with the driving signal so as to output digital touch row data.

The touch sensing circuit 10 and the coordinate calculator 16 may be integrated into one touch IC.

The Tx drive circuit 12 selects a Tx channel which will output a driving signal in response to a Tx setup signal from the Tx/Rx controller 18 in the normal operation mode and applies the driving signal to Tx channels Tx1 to TxN connected to the selected Tx channel. The Tx channels Tx1 to TxN are charged during a high voltage period of the driving signal to provide charges to the touch sensors Cm and discharged during a low voltage period of the driving signal.

The Rx drive circuit 14 accumulates a touch sensor voltage in a capacitor Cs of a predetermined integrator in synchronization with the driving signal and converts the accumulated voltage into digital data through an analog-to-digital converter (referred to as "ADC" hereinafter) so as to output touch raw data. A voltage variation in a touch sensor before and after touch is applied is described. When a touch sensor is touched, capacitance C of the touch sensor is reduced according to Q (charge)=C (capacitance)×V (voltage) and thus a voltage variation in the touch sensor before and after touch is applied thereto is larger than those in other touch sensors to which touch input is not applied. Accordingly, it is possible to determine whether touch input is present according to touch sensor voltage variation before and after touch.

The Rx drive circuit 14 converts a touch sensor voltage variation before and after touch into touch raw data that is digital data and provides the touch raw data to the coordinate calculator 16.

The coordinate calculator 16 executes a predetermined touch recognition algorithm so as to compare the touch raw data received from the Rx drive circuit 14 with a predetermined threshold in the normal operation mode. Any known algorithm can be used as the touch recognition algorithm. The touch recognition algorithm detects touch raw data that exceeds the threshold. Touch raw data that exceeds the threshold is determined as touch data obtained from touch sensors to which touch input is applied. The coordinate calculator 16 executes the touch recognition algorithm to calculate coordinates of touch data that exceeds the threshold. In addition, the coordinate calculator 16 may transmit coordinate information on touch data that exceeds the threshold to a host system that requires the coordinate information. The coordinate calculator 16 may be implemented as a microcontroller unit (MCU).

Figure 5A:
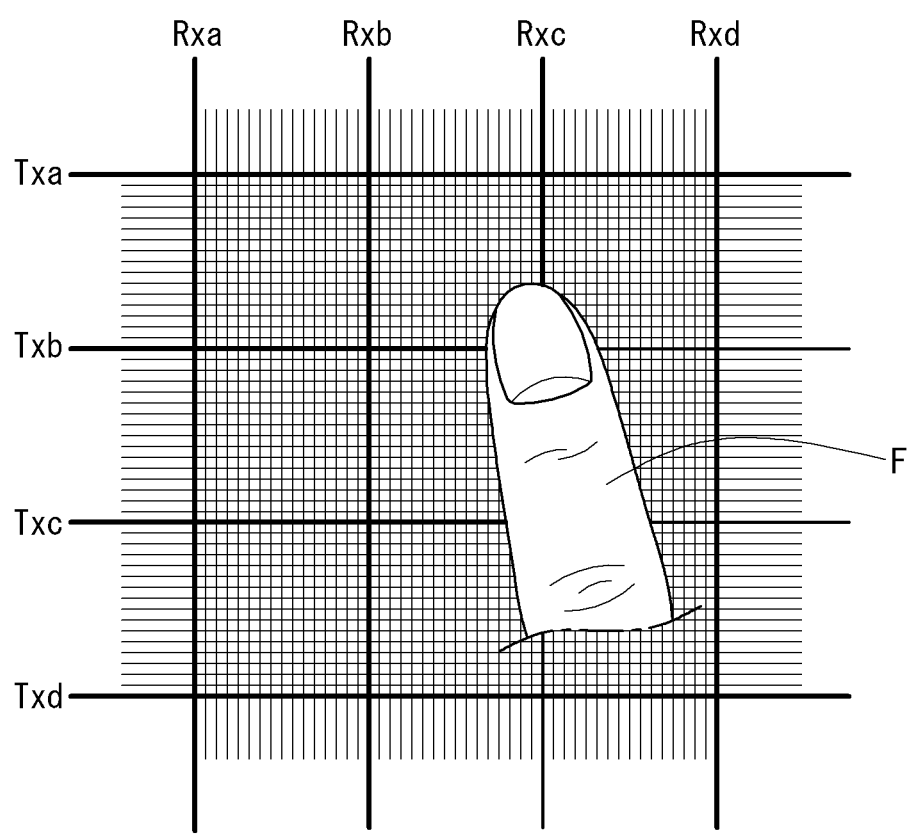
FIGS. 5A and 5B illustrate a procedure of determining touch input according to a finger of a user in a display unit of the mobile terminal according to an embodiment of the present disclosure.
Figure 5B:
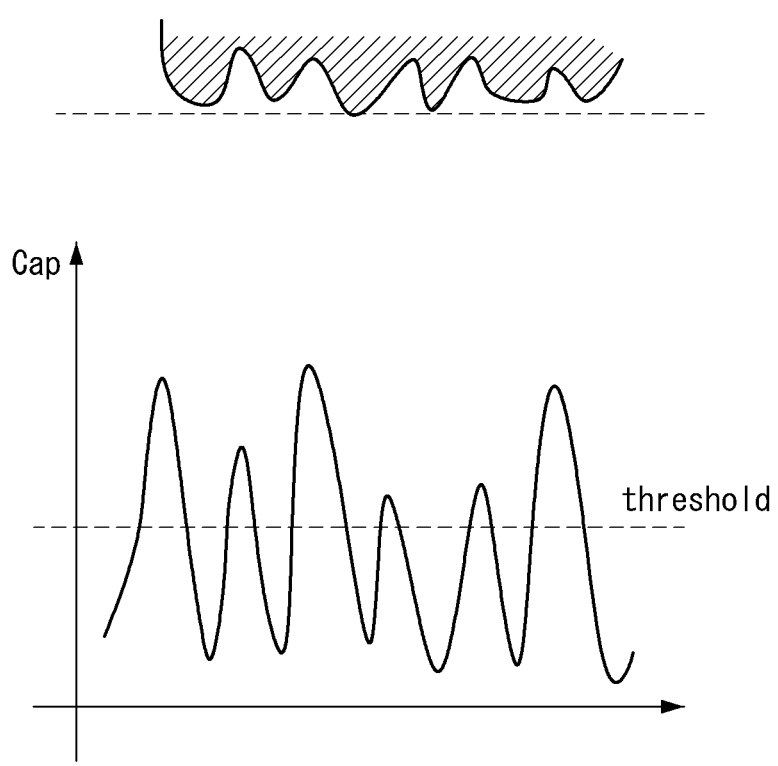

FIGS. 5A and 5B illustrate a procedure of determining whether touch input is applied by a user's finger in the display unit of the mobile terminal according to an embodiment of the present invention.

Referring to FIGS. 5A and 5B, the mobile terminal 100 according to an embodiment of the present invention may be implemented such that the mobile terminal senses touch input only through channels TxA, TxB, TxC, TxD, RxA, RxB, RxC and RxD arranged in a specific interval from among a plurality of Tx channels and a plurality of Rx channels, which are arranged in an intersecting manner at predetermined intervals. For example, when the mobile terminal enters a sleep mode in order to reduce power consumption, only Tx channels in a specific interval are activated and other Tx channels are in a standby state.

When a capacitance change is sensed due to touch input, capacitance variations with respect to all channels (e.g. all Rx channels present between channels RxB and RxD) present between channels (e.g. channel RxC) from which capacitance change is sensed are sensed and binarization for a one-dimensional straight line is performed (refer to FIG. 5B).

When capacitances sensed through the channels exceed the threshold, the capacitances are processed as "1". When capacitances sensed through the channels are lower than the threshold, the capacitances are processed as "0". When the sensed capacitances alternate between 1 and 0, the controller 180 may determine the corresponding touch input as touch input by a user's finger (refer to FIG. 5B).

A fingerprint of a user has ridges protruded from the outer skin and valleys between ridges and people have different ridge and valley patterns. Channels of touch sensors may sense different capacitance variations with respect to ridges and valleys of the fingerprint of the user. Accordingly, when capacitance variations generated in the channels of the touch sensors according to the fingerprint of the user are digitized, 1 and 0 are alternately generated. The controller 180 of the mobile terminal 100 can receive this information from the touch IC and determine whether the corresponding touch input is applied by a user's finger or a touch pen. When touch input by the touch pen is received, the touch IC cannot sense a capacitance variation pattern (pattern in which 1 and 0 are alternately generated) as described above, and thus the controller 180 determines that the corresponding touch input is not touch input by the user's finger (S110: NO). The touch input may then be processed as a non-finger touch input or a normal touch input (S111, S121).

Upon determining that the touch input is not touch input by the user's finger (S110: NO), the controller 180 can recognize the touch input as, for example, a touch input by the touch pen. In this case, the controller 180 can process the touch input by the touch pen.

When the controller 180 determines that the touch input is not touch input by the user's finger (S110: NO), the controller 180 may recognize the touch input as contact of a body portion (e.g. back of a hand, palm, face or the like) of the user other than the fingers and ignore the touch input.

That is, the controller 180 need not perform operation for acquiring a fingerprint image for fingerprint authentication when determining that the touch input is not touch input by the user's finger, and thus processor efficiency can be improved.

A description will be given of operations of the mobile terminal upon determining that touch input by the user's finger is received.

Figure 6:
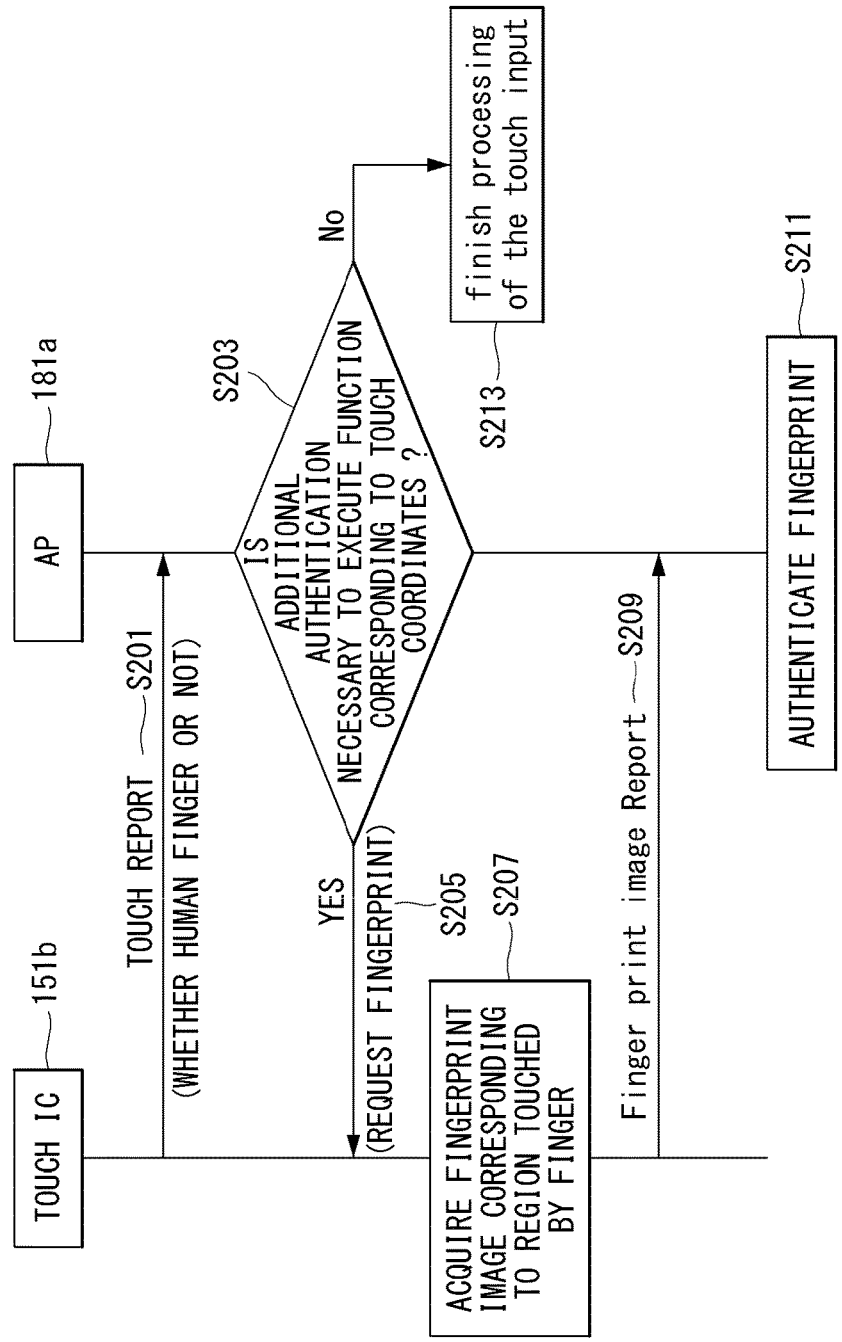
FIG. 6 is a flowchart illustrating a procedure of acquiring fingerprint information for authentication in the mobile terminal according to an embodiment of the present disclosure.

FIG. 6 illustrates a procedure of acquiring fingerprint information in the mobile terminal according to an embodiment of the present invention.

Referring to FIG. 6, the mobile terminal 100 according to an embodiment of the present invention may include a touch IC 151*b* and an application processor (AP) 181*a* integrated with the touchscreen 151.

The touch IC 151*b* may be implemented in such a manner that a touchscreen (TSP) drive circuit and a coordinate calculator for calculating coordinates of a touch point are integrated into one chip, as described with reference to FIG. 3. The application processor 181*a* may be provided as a separate module or the controller 180 may execute all functions of the application processor 181*a*.

The touch IC 151*b* processes received touch input and transmits a touch report to the application processor 181*a* (S201). The touch report may include information (Human Finger) indicating that the received touch input is touch input by the user's finger and coordinate information on the touch point to which the touch input is applied.

The application processor 181*a* may check whether additional authentication is required to execute a function corresponding to the touch coordinates (S203).

That is, when the touch point to which the touch input is applied corresponds to a predetermined application, the application processor 181*a* can check whether the application is an application executed through additional authentication.

When the application is an application executable without additional authentication (S203: NO), the application processor 181*a* can finish processing of the touch input while executing the application in response to the touch input (S213).

When additional authentication is required (S203: YES), the application processor 181*a* can request the touch IC 151*b* to provide the fingerprint information of the user (S205). The fingerprint information may be a fingerprint image.

The touch IC 151*a* can acquire a fingerprint image of a region with which the user's finger comes into contact on the touchscreen 151 (S207).

The touch IC 151*a* can obtain a fingerprint image of the user through an operation of scanning only a region of the touchscreen 151, which comes into contact with the user's finger, only at the request of the application processor 181*a*, as described above, rather than acquiring the fingerprint image whenever touch input by the user's finger is received. Accordingly, resources of processors such as the touch IC, the application processor and the like can be efficiently used.

The touch IC 151*b* transmits the acquired fingerprint image to the application processor 181*a* (S209, Fingerprint Image Report).

The application processor 181*a* can perform fingerprint authentication by comparing the fingerprint image received from the touch IC 151*b* with pre-stored fingerprint information of the user (S211).

The procedure of processing touch input between the display unit 151 and the controller 180 so as to perform fingerprint authentication more efficiently through the fingerprint sensor has been described. A description will be given of examples of providing a user interface necessary for authentication differently according to whether applied touch input is touch input by the user's finger according to an embodiment of the present invention.

Figure 7:
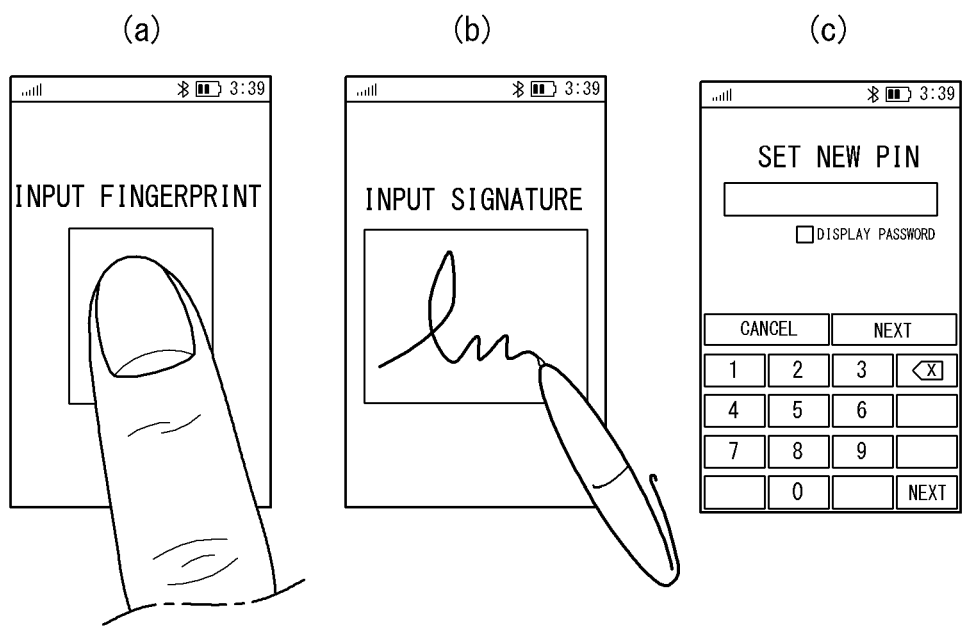
FIG. 7 illustrates an example of registering authentication information according to an embodiment of the present disclosure.

FIG. 7 illustrates an example of registering authentication information according to an embodiment of the present invention. A method for controlling the mobile terminal according to an embodiment of the present invention may be implemented in the mobile terminal 100 described above with reference to FIGS. 1A to 5B.

Referring to FIG. 7, the user may register their fingerprint information in the mobile terminal 100. Fingerprint registration can be achieved by storing a fingerprint image (FIG. 7(*a*)). A signature (FIG. 7(*b*)) or a password (FIG. 7(*c*)) may be matched to the stored fingerprint image and pre-registered.

The fingerprint of the user is registered for a specific item such that fingerprint authentication is required when the item is executed.

FIGS. 8A to 8D illustrate another example of registering authentication information according to an embodiment of the present invention.

Figure 8A:
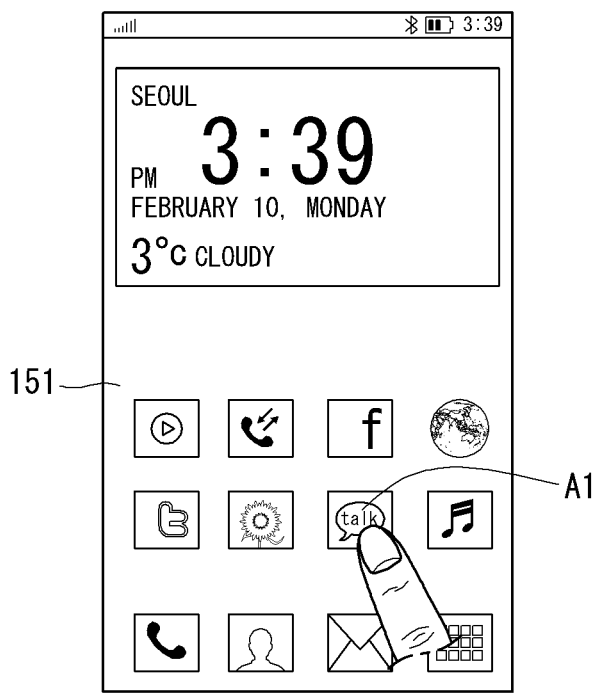
FIGS. 8A to 8D illustrate another example of registering authentication information according to an embodiment of the present disclosure.

Referring to FIG. 8A, the controller 180 may receive predetermined touch input for an application A1 from among one or more applications displayed on the touchscreen 151 to enter a mode in which locking according to a fingerprint is set for the application A1.

The predetermined touch input may include long touch input applied to the application A1.

Figure 8B:
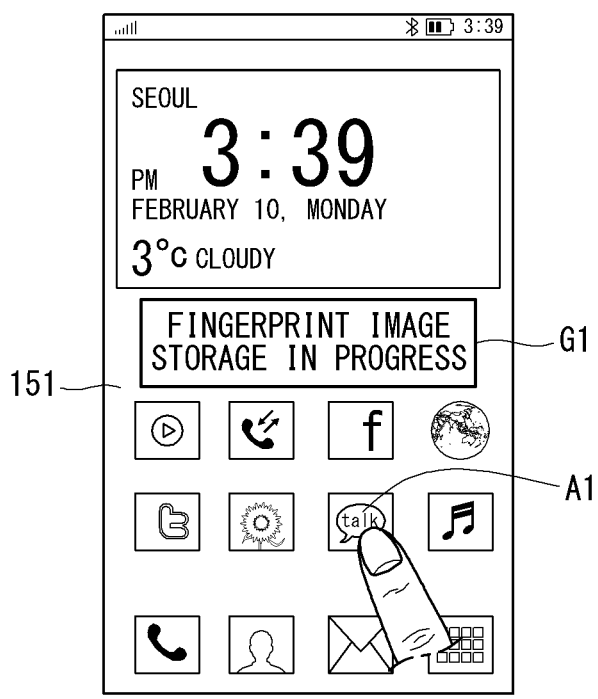

Referring to FIG. 8B, the controller 180 may display a guide G1, which indicates that locking according to the fingerprint is being set for the application A1, on the touchscreen 151 upon reception of long touch input applied to the application A1. As the guide G1 is provided, the user can intuit that the fingerprint image is being scanned and stored.

Figure 8C:
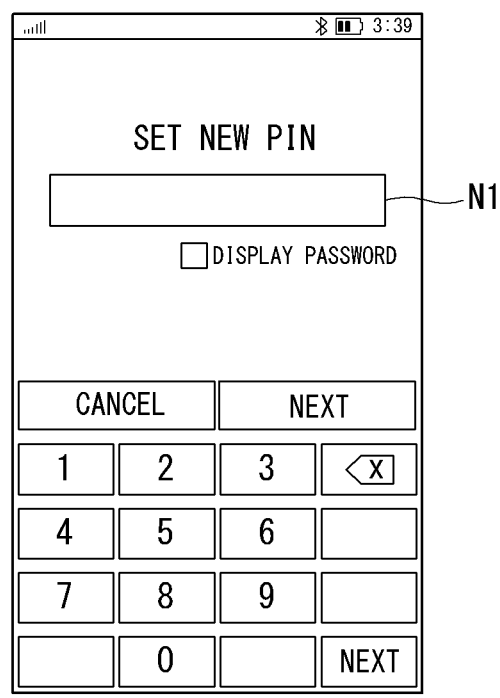

Referring to FIG. 8C, a window N1 for inputting a password corresponding to lock function setting according to the fingerprint for the application A1 may be provided.

Accordingly, the user can access the application A1 through fingerprint authentication or input of the password.

Figure 8D:
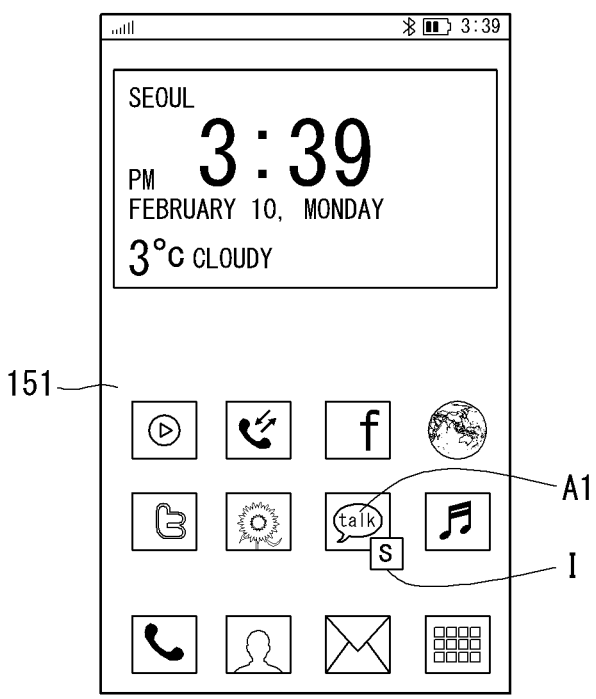

Referring to FIG. 8D, the controller 180 displays a predetermined indicator I along with the application for which locking according to the fingerprint is set such that the user can easily recognize the application for which locking according to the fingerprint has been set.

FIGS. 9A to 12B illustrate examples of providing a user interface for authentication differently according to whether applied touch input is touch input by a user's finger according to an embodiment of the present invention.

Figure 9A:
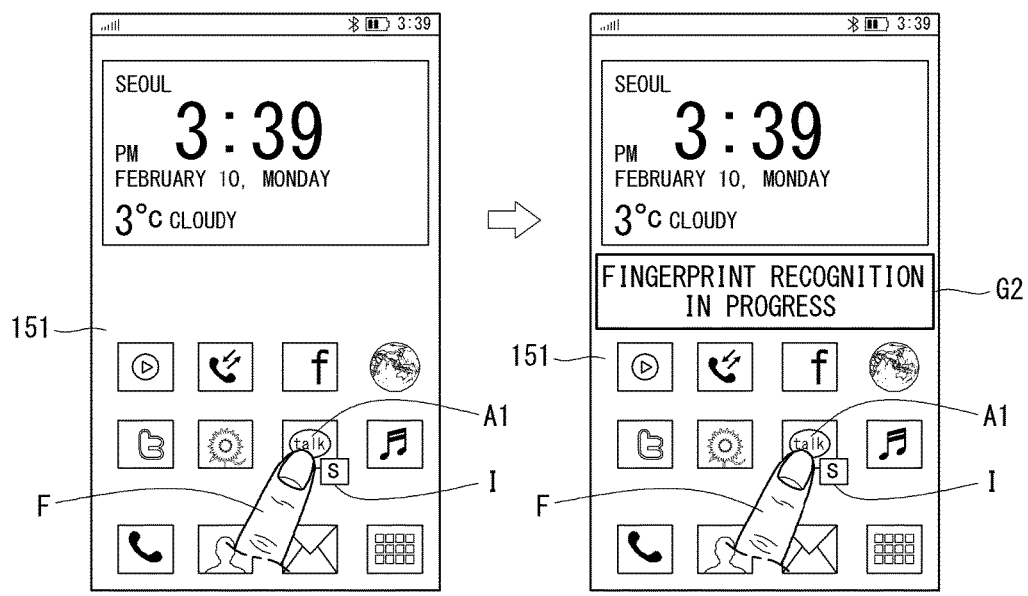
FIGS. 9A to 12B illustrate an example of providing a user interface for authentication differently according to touch input by a user's finger in accordance with an embodiment of the present disclosure.
Figure 9B:
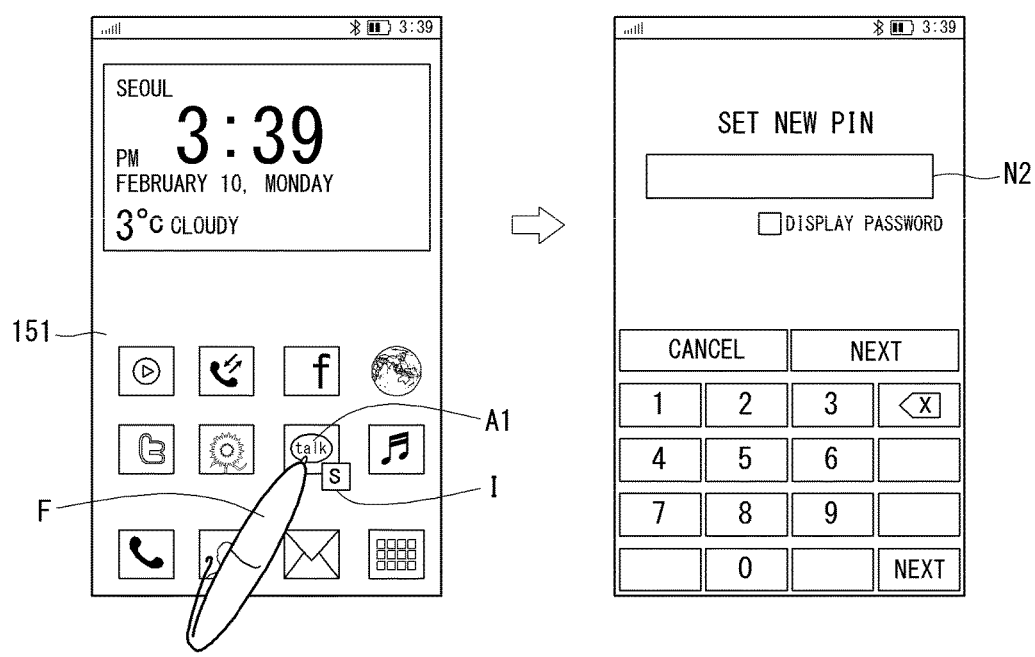

FIGS. 9A and 9B illustrate an example of applying the method for controlling the mobile terminal according to an embodiment of the present invention to each application.

FIGS. 9A and 9B are views for explaining a procedure of authenticating locking set to a specific application according to touch input means.

Referring to FIG. 9A, when an input for selecting an application A1 for which locking is set is received, the controller 180 checks whether the input is touch input by the user's finger according to the aforementioned method and requests the touch IC to provide the fingerprint information of the user upon determining that the application corresponding to the touch point needs to be authenticated.

The controller 180 may provide a guide G2 indicating that fingerprint recognition is in progress to the touchscreen 151 so that the user does not release the finger from the touchscreen 151.

Referring to FIG. 9B, upon reception of an input for selecting the locked application A1, the controller 180 checks whether the input is touch input by the user's finger through the aforementioned method. When the controller 180 determines that the input is touch input by a touch pen P and the application corresponding to the touch point needs to be authenticated, the controller 180 may display a window N2 for inputting a predetermined pattern on the touchscreen 151.

Figure 10A:
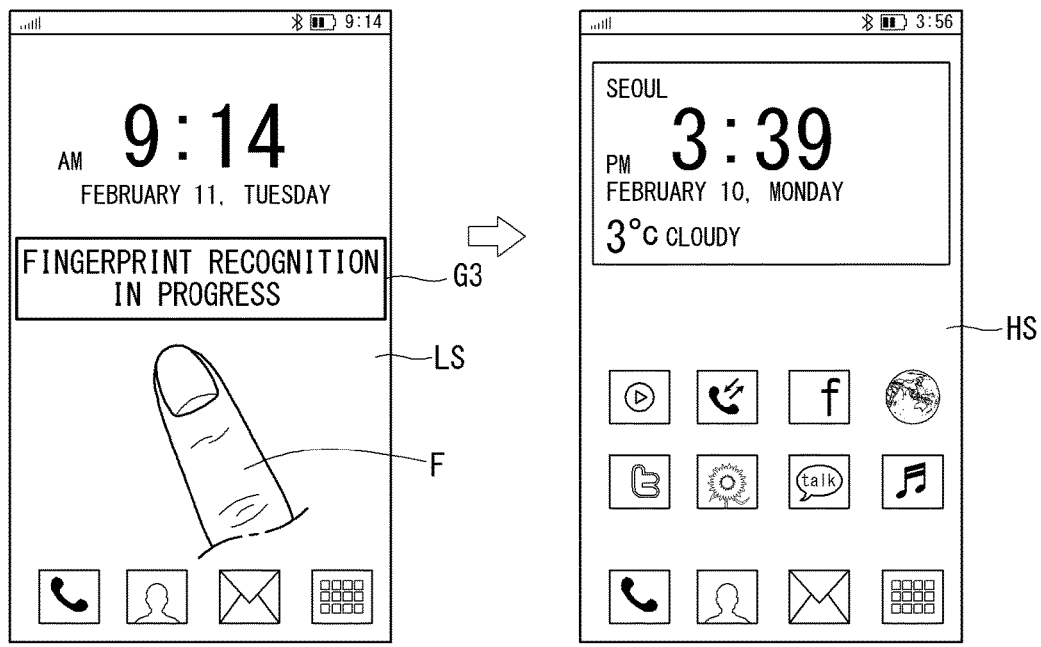
Figure 10B:
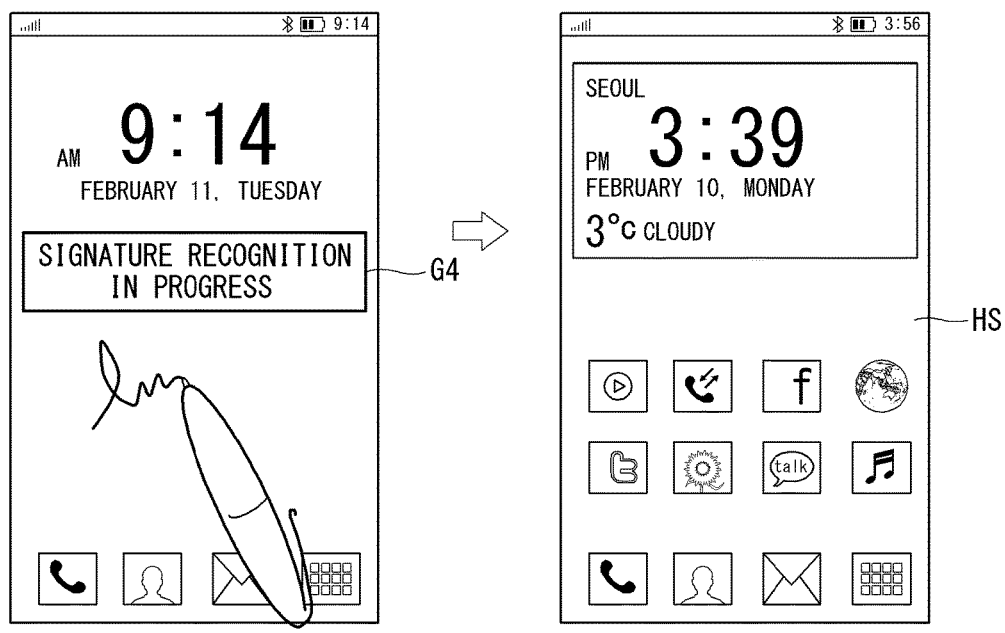

FIGS. 10A and 10B illustrate an example of applying the method for controlling the mobile terminal according to an embodiment of the present invention to a lock screen.

Referring to FIG. 10A, the controller 180 may display a lock screen LS on the touchscreen 151. When touch input applied to the touchscreen 151 is received while the lock screen LS is displayed, the controller 180 may check whether the touch input is touch input by the user's finger F through the aforementioned method and determine whether authentication is necessary to execute a function corresponding to the touch point. Since the touch input is applied to the lock screen LS, the controller 180 may determine that authentication is necessary to cancel the lock mode.

Accordingly, the controller 180 may request the touch IC to provide the fingerprint information of the user and the touch IC may acquire a fingerprint image. In this case, a guide G3 indicating that fingerprint image acquisition is in progress may be displayed on the touchscreen 151 so that the user does not release the finger. When the acquired fingerprint image is valid, the lock mode may be cancelled and a home screen HS may be displayed on the touchscreen 151.

Referring to FIG. 10B, when touch input applied to the touchscreen 151 is received while the lock screen LS is displayed on the touchscreen 151, the controller 180 may determine the touch input as touch input by the touch pen P upon checking a touch means through the aforementioned method. In this case, when signature by the touch pen P is input, a guide G4 indicating that input signature recognition is in progress may be displayed on the touchscreen 151. When the signature is valid, the lock mode may be cancelled and the home screen HS may be displayed on the touchscreen 151.

While the examples of recognizing touch input by the user's finger according to the touch algorithm upon reception of the touch input by the user's finger, checking whether authentication is necessary and automatically scanning the fingerprint image almost simultaneously with reception of the touch input have been described, the present invention is not limited thereto. For example, when a fingerprint input window is provided, the controller 180 may request the touch IC to acquire a fingerprint image.

Figure 11A:
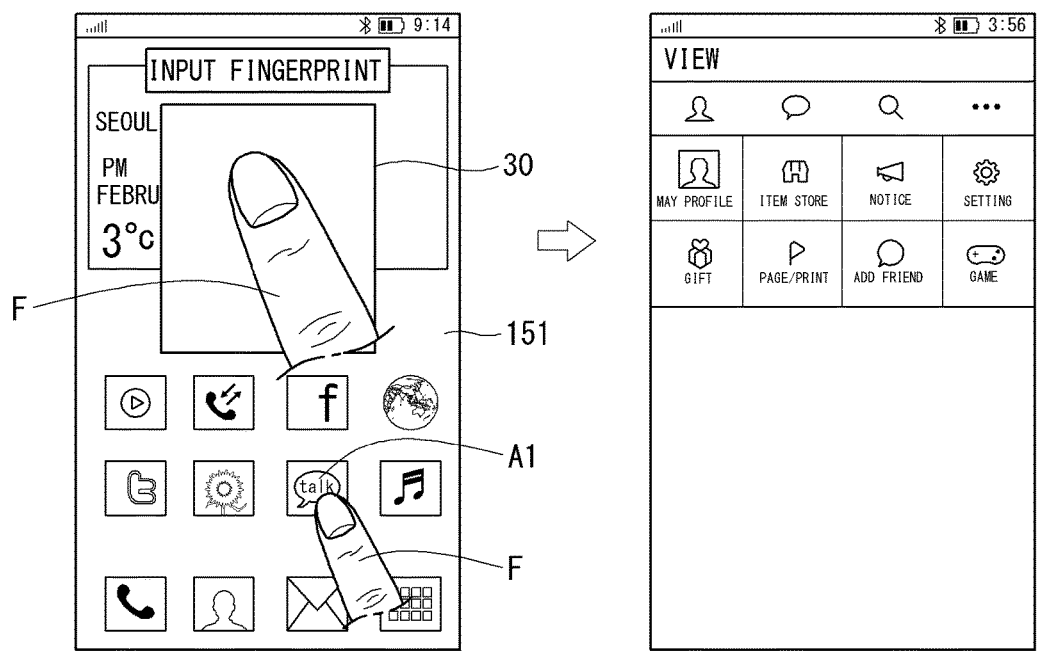
Figure 11B:
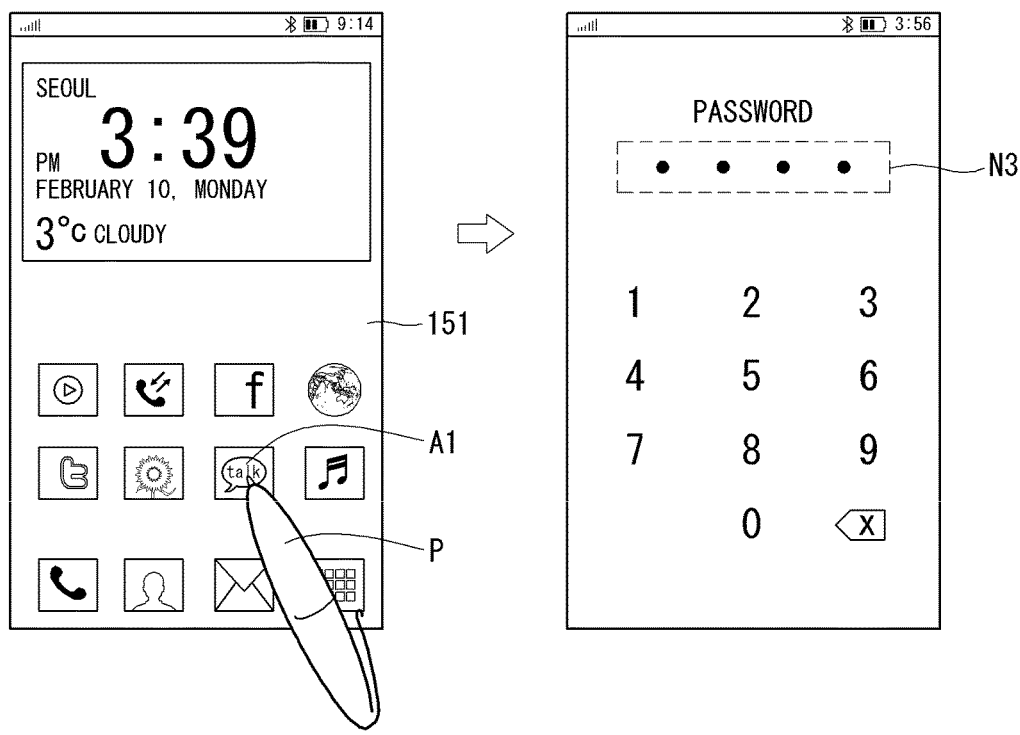

FIGS. 11A and 11B illustrate another example of fingerprint authentication through the method for controlling the mobile terminal according to an embodiment of the present invention.

Referring to FIG. 11A, upon reception of touch input for selecting the locked application A1, the controller 180 may check whether the touch input is touch input by the user's finger F through the aforementioned method. The controller 180 may request the touch IC to provide the fingerprint information of the user and, simultaneously, provide a fingerprint input window 30 to the touchscreen 151 upon determining that the application corresponding to the touch point needs to be authenticated.

When a user's finger additionally touches the fingerprint input window 30, the touch IC may recognize the fingerprint of the user, input through the fingerprint input window 30. Accordingly, fingerprint recognition is not performed on the user's finger coming into contact with the touchscreen 151 before the fingerprint input window 30 is displayed, thereby improving efficiency of resource utilization.

When the fingerprint is determined to be valid as a result of fingerprint authentication, an execution screen of the application may be displayed on the touchscreen 151.

When the valid fingerprint is matched to a predetermined password, the controller 180 may control the predetermined password to be automatically input such that the application can be automatically executed without password input upon valid fingerprint authentication.

Referring to FIG. 11B, the controller 180 may determine that the touch input for selecting the locked application A1 is touch input by the touch pen P. In this case, the controller 180 may provide a screen B3 through which a predetermined password is input in order to execute the application, to the touchscreen 151.

While examples of providing a user interface for authentication differently according to whether received touch input is touch input by the user's finger and whether authentication (e.g. fingerprint authentication, pin number input, signature input and the like) is necessary to execute a predetermined function corresponding to a touch point have been described in the aforementioned embodiments, the present invention is not limited thereto. For example, when fingerprint authentication is performed by touch input by the user's finger, an item set as a secret item by the user may be opened.

Figure 12A:
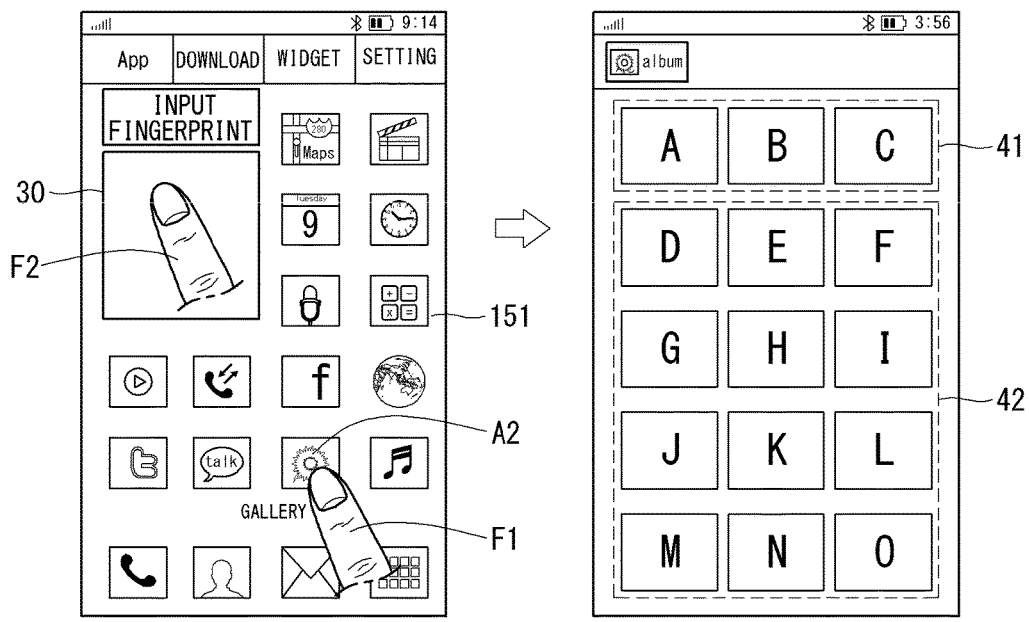
Figure 12B:
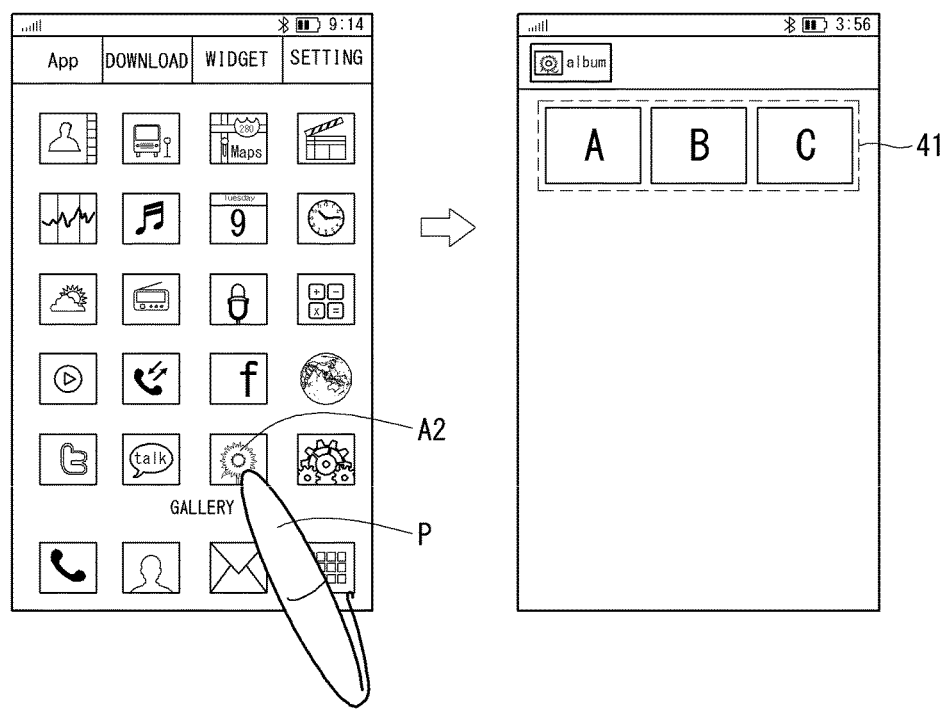

FIGS. 12A and 12B illustrate an example of differently setting an item open degree through the method for controlling the mobile terminal according to an embodiment of the present invention.

Referring to FIG. 12A, upon reception of input for selecting a locked application A2 (music player application), the controller 180 checks whether the input is touch input by a user's finger F1 through the aforementioned method. In addition, the controller 180 may request the touch IC to provide the fingerprint information of the user upon determining that the application A2 corresponding to the touch point needs to be authenticated. Referring to FIG. 12A, the controller 180 may provide the fingerprint input window 30 to the touchscreen 151 and perform option of acquiring a fingerprint image when touch input F2 is received through the fingerprint input window 30.

Upon determining that the acquired fingerprint image is valid, the controller 180 may display a first music file group 41 and a second music file group 42 on the touchscreen 151. Here, the first music file group 41 may be files that are open irrespective of fingerprint authentication whereas the second music file group 42 may be files that are open when valid fingerprint authentication is performed.

Referring to FIG. 12B, the controller 180 may determine that the touch input for selecting the locked application A2 is touch input by the touch pen P. In this case, the controller 180 may display only the first music file group 41 on the touchscreen 151 and hide the second music file group 42.

FIGS. 13A to 13D illustrate an operation of the mobile terminal to process received touch input when the touch input is not touch input by a user's finger according to the embodiment shown in FIG. 2 (e.g., S111).

Figure 13A:
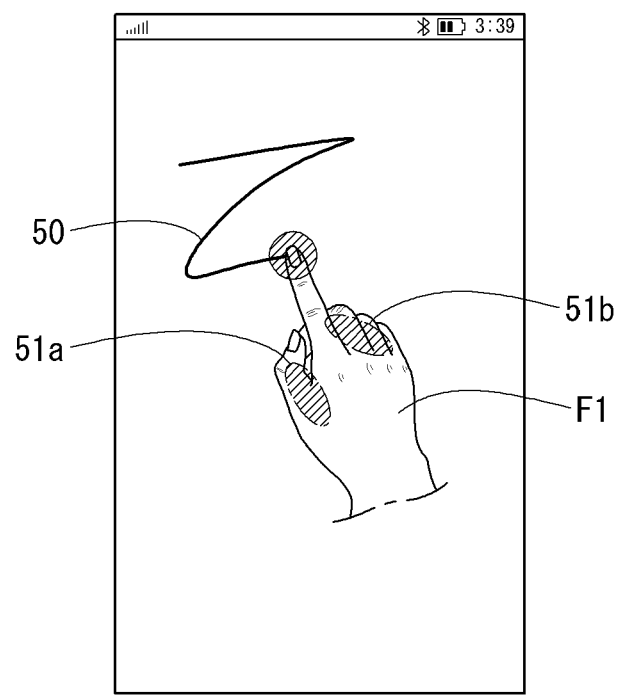
FIGS. 13A to 13D illustrate operation of the mobile terminal to process the touch input when the touch input is not touch input by a user's finger in accordance with the embodiment shown in FIG. 2.
Figure 13B:
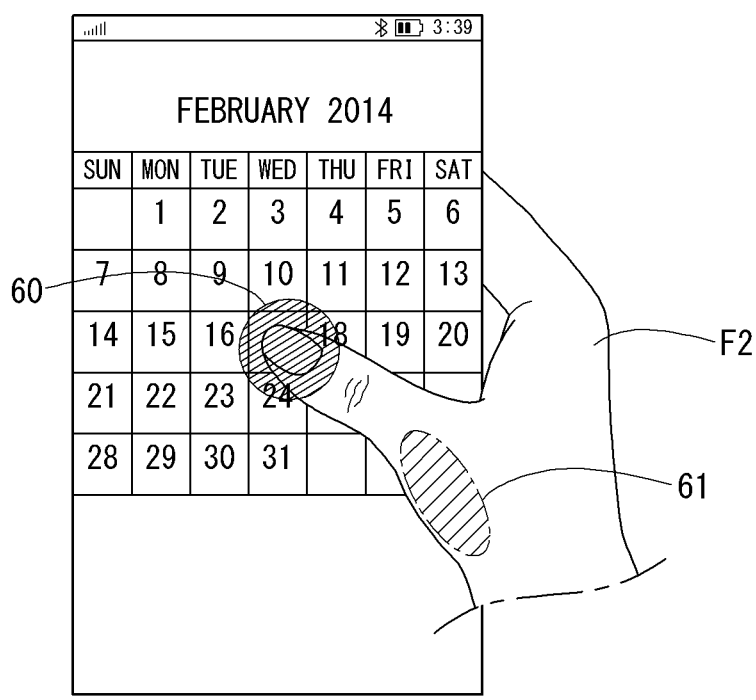

Referring to FIGS. 13A and 13B, the mobile terminal 100 according to an embodiment of the present invention may process only touch input by the user's finger as normal touch input when touch input by the user's finger and touch inputs according to user's body portions other than the finger are recognized.

For example, handwriting input 50 may be applied by the user's finger F1 to the touchscreen 151, as shown in FIG. 13A. In this case, only the touch input by the user's finger F1 may be recognized as normal touch input and touch input by the remaining portion of the user's hand (e.g. palm 51a and at least a portion 51b that touches the touchscreen 151 when the user turns in the fingers) may be ignored without being processed as normal touch input.

Referring to FIG. 13B, when the user grips the mobile terminal 100 with a hand, while touch input by a finger F2 of the hand may be applied to select a predetermined item displayed on the touchscreen 151, the user's hand gripping the mobile terminal 100 may touch an edge 61 of the touchscreen 151. The controller 180 may ignore the touch input applied to the edge 62.

Figure 13C:
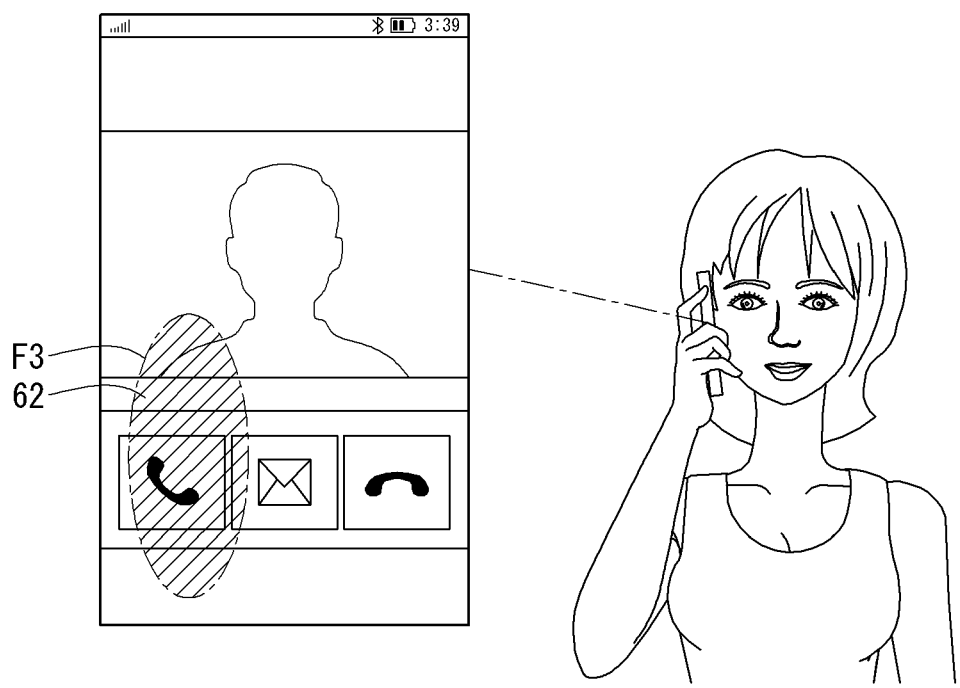

Referring to FIG. 13C, when touch input by a part of the body of the user other than a finger is recognized, the touch input may be ignored. For example, the controller 180 can ignore touch input applied to a region 62 which comes into contact with the face F3 of the user when the mobile terminal 100 is connecting a call. Accordingly, termination of a call by unnecessary touch is prevented while the call is being connected.

Figure 13D:
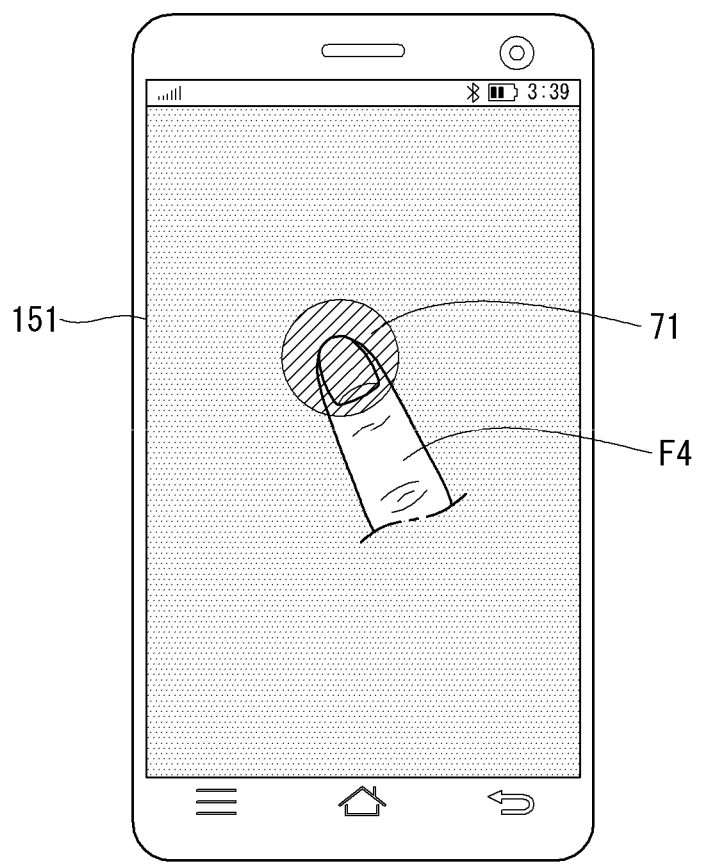

Referring to FIG. 13D, when the mobile terminal 100 receives a predetermined pattern input of tapping on the touchscreen 151 with a user's finger while the display unit 151 is turned off, the display unit 151 may be turned on and the lock mode may be cancelled. In this case, the tapping in the predetermined pattern may be recognized through input 71 by a user's finger F4 and touch input by means other than a user's finger may be ignored without being processed as normal touch input.

The mobile terminal and the method for controlling the same according to the present invention have the following advantages.

According to at least one embodiment of the present invention, it is possible to process touch input according to the purpose of touch of the user by processing the touch input more accurately.

In addition, according to at least one embodiment of the present invention, it is possible to acquire a fingerprint image of the user only upon determining that fingerprint authentication is necessary when touch input is received, thereby efficiently managing resources of the terminal.

Furthermore, according to at least one embodiment of the present invention, it is possible to provide an authentication procedure differently according to touch input means when authentication is required.

As broadly described and embodied herein, a mobile terminal may include a touchscreen configured to sense touch inputs, and a controller configured to determine whether a touch input is an input using a finger of a user. When the touch input is determined to be a touch input using a user's finger and a function associated with the touch input requires authentication, a prescribed user interface for authentication is provided. The prescribed user interface for authentication when the touch input is an input using a user's finger may be different than a user interface for authentication when the touch input is not an input using a user's finger.

The mobile terminal may include a fingerprint sensor integrated with the touchscreen and configured to recognize a fingerprint. Fingerprint information of the user may be acquired through the fingerprint sensor when the touch input is a touch input using the user's finger and authentication is necessary, and the function intended by the touch input is executed when the acquired fingerprint information corresponds to pre-registered fingerprint information.

The touchscreen may include a touch IC including a plurality of Tx lines, a plurality of Rx lines intersecting the Tx lines and touch sensors formed at intersections of the Tx lines and the Rx lines. The touch IC may be configured to acquire a fingerprint image corresponding to touch sensors touched by the user's finger from among the touch sensors.

The controller may be configured to recognize coordinates of a touch point corresponding to the touch input and to acquire the fingerprint image through the touch IC when fingerprint authentication is necessary to execute an application corresponding to the recognized coordinates. The controller may also be configured to provide, on the touchscreen, a notification indicating that acquisition of the fingerprint information of the user through the fingerprint sensor is in progress.

The controller may be configured to display a fingerprint input window on the touchscreen and to acquire the fingerprint information of the user through the fingerprint sensor when a finger of the user touches the fingerprint input window. The fingerprint sensor may be activated when the fingerprint input window is displayed. The fingerprint sensor may be activated when the touch input is determined to be a touch input using a user's finger. Moreover, the fingerprint sensor may be activated when the touch input is determined to be a touch input using a user's finger and the function associated with the touch input requires authentication.

The user interface for authentication when the touch input is not an input using the user's finger may be a window for inputting a predetermined pattern for authentication on the touchscreen. The touch input may be an input using a stylus pen. The user interface for authentication when the touch input is not an input using the user's finger may also be a window for inputting a password or passcode. Moreover, when the touch input is recognized as including a touch by the user's finger and a part of the user's body other than the finger, the controller is configured to process the touch input for only the touch by the user's finger as a normal touch input.

The functions requiring authentication may include at least one of a function to unlock a locked screen, a function to unlock a locked application or a function to unlock a locked touchscreen while turning on the touchscreen from an off state.

In one embodiment, a method for controlling a mobile terminal may include receiving touch input applied to a touchscreen, processing the touch input to determine whether the touch input is an input using a finger of a user, and providing a user interface for authentication when a function associated with the touch input requires authentication. The user interface for authentication when the touch input is an input using the user's finger may be different than a user interface necessary for authentication when the touch input is not an input using a user's finger.

The method may further include acquiring fingerprint information of the user through a fingerprint sensor integrated with the touchscreen when the touch input is an input using the user's finger and authentication is necessary, and executing the function intended by the touch input when the acquired fingerprint information corresponds to pre-registered fingerprint information. Moreover, the fingerprint sensor may be activated when the touch input is determined to be a touch input using a user's finger and the function associated with the touch input requires authentication.

The user interface for authentication when the touch input is not an input using a user's finger may be a window for inputting a predetermined pattern for authentication on the touchscreen. The user interface for authentication when the touch input is not an input using a user's finger may also be a window for inputting a password or passcode.

Moreover, when the touch input is recognized as including a touch by the user's finger and a part of the user's body other than the finger, processing the touch input for only the touch by the user's finger as a normal touch input.

Various embodiments may be implemented using a machine-readable medium having instructions stored thereon for execution by a processor to perform various methods presented herein. Examples of possible machine-readable media include HDD (Hard Disk Drive), SSD (Solid State Disk), SDD (Silicon Disk Drive), ROM, RAM, CD-ROM, a magnetic tape, a floppy disk, an optical data storage device, other types of storage media presented herein, and combinations thereof. If desired, the machine-readable medium may be realized in the form of a carrier wave (for example, transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal, comprising:
   a touchscreen displaying a plurality of icons, the plurality of icons including a first icon corresponding to a first application requiring authentication to execute the first application and provided on a first region of the touchscreen, the touchscreen including:
   a plurality of Tx lines in a touch sensing layer, wherein the plurality of Tx lines include a plurality of primary Tx lines and a plurality of subsidiary Tx lines, and the plurality of subsidiary Tx lines are provided between neighboring ones of the plurality of primary Tx lines;
   a plurality of Rx lines intersecting the plurality of Tx lines in the touch sensing layer, wherein the plurality of Rx lines include a plurality of primary Rx lines and a plurality of subsidiary Rx lines, and the plurality of subsidiary Rx lines are provided between neighboring ones of the plurality of primary Rx lines,
   a first sensor formed at the touchscreen, the first sensor including the plurality of primary Tx lines and the plurality of primary Rx lines;
   a second sensor formed at the touch screen, the second sensor including a first portion of the plurality of primary Tx lines and the plurality of subsidiary Tx lines provided between neighboring Tx lines of the first portion of the plurality of primary Tx lines, and a first portion of the plurality of primary Rx lines and the plurality of subsidiary Rx lines provided between neighboring Rx lines of the first portion of the plurality of primary Rx lines, wherein the second sensor is overlapping with the first region and is activated in response to a touch input received via the first sensor on the first region of the touchscreen; and a controller configured to:
receive a touch input via the first sensor and activate the second sensor;
receive touch input signals via the second sensor and binarize the touch input signals to determine whether the touch input signals correspond to a finger touch input or a non-finger touch input;
receive first fingerprint information via the second sensor when the touch input signals are determined to correspond to a finger touch input and execute the first application when the first fingerprint information matches reference fingerprint information; and
control the touchscreen to display a prescribed user interface for authentication when the touch input signals are determined to correspond to a non-finger touch input.

2. The mobile terminal of claim 1, wherein the controller is configured to provide, on the touchscreen, a notification indicating that acquisition of the first fingerprint information of the user through the second sensor is in progress.

3. The mobile terminal of claim 1, wherein the prescribed user interface includes a window for inputting a signature when the touch input is an input using a stylus pen.

4. The mobile terminal of claim 1, wherein the prescribed user interface includes a window for inputting a password or passcode.

5. The mobile terminal of claim 1, wherein the controller is further configured to:
receive the first fingerprint information when the binarized touch input signals include a fingerprint pattern.

6. The mobile terminal of claim 5, wherein a distance between the neighboring ones of the primary Tx lines is a first distance, a distance between the neighboring ones of the primary Rx lines is a second distance, a distance between neighboring ones of the subsidiary Tx lines is a third distance, and a distance between neighboring ones of the subsidiary Rx lines is a fourth distance.

7. The mobile terminal of claim 6, wherein the first distance is greater than the third distance, and wherein the second distance is greater than the fourth distance.

8. The mobile terminal of claim 5, wherein the prescribed user interface includes a window for inputting a signature when the binarized touch input signals do not include a fingerprint pattern.

9. The mobile terminal of claim 1, wherein the plurality of Tx lines, the plurality of Rx lines, and the first and second touch sensors are provided in a single layer.

10. A method for controlling a mobile terminal, comprising:
receiving a touch input via a first sensor when the touch input is applied on a first region of a touchscreen, wherein the touchscreen displays a plurality of icons including a first icon corresponding to a first application requiring authentication to execute the first application, the first icon is displayed on the first region of the touchscreen, the touchscreen includes a plurality of Tx lines and a plurality of Rx lines intersecting the plurality of Tx lines in a touch sensing layer, the plurality of Tx lines include a plurality of primary Tx lines and a plurality of subsidiary Tx lines, the plurality of subsidiary Tx lines are provided between neighboring ones of the plurality of primary Tx lines, the plurality of Rx lines include a plurality of primary Rx lines and a plurality of subsidiary Rx lines, the plurality of subsidiary Rx lines are provided between neighboring ones of the plurality of primary Rx lines, and the first sensor includes the plurality of primary Tx lines and the plurality of primary Rx lines;

receiving touch input signals via a second sensor in response to the touch input received via the first sensor on the first region of the touchscreen and binarizing the touch input signals to determine whether the touch input signals correspond to a finger touch input or a non-finger touch input, wherein the second sensor includes a first portion of the plurality of primary Tx lines and the plurality of subsidiary Tx lines provided between neighboring Tx lines of the first portion of the plurality of primary Tx lines, and a first portion of the plurality of primary Rx lines and the plurality of subsidiary Rx lines provided between neighboring Rx lines of the first portion of the plurality of primary Rx lines, wherein the second sensor is overlapping with the first region; and receiving first fingerprint information via the second sensor when the touch input signals are determined to correspond to a finger touch input and executing the first application when the first fingerprint information matches reference fingerprint information; and displaying a prescribed user interface for authentication on the touchscreen when the touch input signals are determined to correspond to a non-finger touch input.

11. The method of claim 10, wherein the prescribed user interface includes a window for inputting a signature when the touch input is an input using a stylus pen.

12. The method of claim 10, wherein the prescribed user interface includes a window for inputting a password or passcode.

13. The method of claim 10, wherein a distance between the neighboring ones of the primary Tx lines is a first distance, a distance between the neighboring ones of the primary Rx lines is a second distance, a distance between neighboring ones of the subsidiary Tx lines is a third distance, and a distance between neighboring ones of the subsidiary Rx lines is a fourth distance.

14. The method of claim 13, wherein the first distance is greater than the third distance, and the second distance is greater than the fourth distance.

* * * * *